(12) United States Patent
Sargent

(10) Patent No.: US 11,772,188 B1
(45) Date of Patent: Oct. 3, 2023

(54) ADDITIVE FRICTION STIR DEPOSITION SYSTEM FOR REFRACTORY METALS

(71) Applicant: Lockheed Martin Corporation, Bethesda, MD (US)

(72) Inventor: Kenneth R. Sargent, Montverde, FL (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 182 days.

(21) Appl. No.: 17/519,118

(22) Filed: Nov. 4, 2021

(51) Int. Cl.
*B23K 20/12* (2006.01)
*B33Y 30/00* (2015.01)
*B33Y 10/00* (2015.01)

(52) U.S. Cl.
CPC ...... *B23K 20/1215* (2013.01); *B23K 20/1225* (2013.01); *B33Y 10/00* (2014.12); *B33Y 30/00* (2014.12)

(58) Field of Classification Search
CPC ............ B23K 20/1215; B23K 20/1225; B23K 20/122–128; B33Y 10/00; B33Y 30/00
USPC ................. 228/2.1, 112.1
See application file for complete search history.

(56) References Cited

U.S. PATENT DOCUMENTS

| | | | |
|---|---|---|---|
| 5,544,813 A * | 8/1996 | Giles | B05B 15/00 239/587.5 |
| 6,543,671 B2 | 4/2003 | Hatten et al. | |
| 8,397,974 B2 | 3/2013 | Schultz et al. | |
| 8,632,850 B2 | 1/2014 | Schultz et al. | |
| 8,636,194 B2 | 1/2014 | Schultz et al. | |
| 8,875,976 B2 | 11/2014 | Schultz et al. | |
| 10,780,523 B1 | 9/2020 | Sargent | |
| 10,987,754 B1 | 4/2021 | Eller et al. | |
| 11,458,564 B2 * | 10/2022 | Fleck | B23K 20/129 |
| 2003/0042292 A1 * | 3/2003 | Hatten | B23K 20/128 228/2.1 |
| 2008/0041921 A1 | 2/2008 | Creehan et al. | |
| 2010/0108742 A1 * | 5/2010 | Stol | B23K 20/1255 228/2.1 |

(Continued)

FOREIGN PATENT DOCUMENTS

| | | | | |
|---|---|---|---|---|
| CN | 103459081 A | * | 12/2013 | ......... B23K 20/1245 |
| CN | 103764333 B | * | 5/2016 | ........... B23B 31/008 |

(Continued)

*Primary Examiner* — Kiley S Stoner
(74) *Attorney, Agent, or Firm* — Terry M. Sanks, Esq.; Beusse Sanks, PLLC

(57) ABSTRACT

An additive friction stir deposition system for refractory metals is disclosed herein. The additive friction stir deposition system includes a tool assembly and an induction element. The tool assembly includes a metal shaft defining a shaft central channel, and a ceramic tip defining a tip central channel. The metal shaft and the ceramic tip are configured to interlock to prevent relative rotation therebetween. The induction element is positioned adjacent to the ceramic tip. As a refractory metal feedstock is fed through the shaft central channel and the tip central channel, the induction element heats the portion of the refractory metal feedstock within the tip central channel, but does not heat the ceramic tip itself. Accordingly, the refractory metal feedstock can be heated prior to application to a workpiece without heating the tip of the tool assembly, improving performance of the additive friction stir deposition system and the resulting workpiece.

19 Claims, 7 Drawing Sheets

(56) References Cited

U.S. PATENT DOCUMENTS

| | | |
|---|---|---|
| 2010/0285207 A1 | 11/2010 | Creehan et al. |
| 2012/0009339 A1 | 1/2012 | Creehan et al. |
| 2012/0279441 A1 | 11/2012 | Creehan et al. |
| 2012/0279442 A1* | 11/2012 | Creehan .................. C23C 26/00 228/2.1 |
| 2013/0068825 A1* | 3/2013 | Rosal ..................... B23K 20/26 228/2.1 |
| 2014/0361069 A1* | 12/2014 | Silvanus ............ B23K 20/1225 228/2.1 |
| 2015/0165546 A1* | 6/2015 | Kandasamy ......... B23K 20/128 228/2.1 |
| 2016/0031159 A1* | 2/2016 | Church ................ B29C 48/872 425/375 |
| 2016/0175981 A1* | 6/2016 | Kandasamy ....... B23K 20/1295 228/114.5 |
| 2016/0175982 A1* | 6/2016 | Kandasamy ....... B23K 20/1245 228/114.5 |
| 2017/0043429 A1* | 2/2017 | Kandasamy ....... B23K 20/2333 |
| 2017/0203359 A1* | 7/2017 | Pascall ................. B22D 23/003 |
| 2018/0085849 A1* | 3/2018 | Kandasamy ......... B23K 20/129 |
| 2018/0339342 A1* | 11/2018 | Hofmann ............. B33Y 10/00 |
| 2018/0354058 A1* | 12/2018 | Twelves, Jr. ........... B23K 9/124 |
| 2018/0361501 A1* | 12/2018 | Hardwick ............. B33Y 10/00 |
| 2020/0189025 A1* | 6/2020 | Rodriguez ........... B23K 20/122 |
| 2020/0306869 A1 | 10/2020 | Hardwick et al. |
| 2021/0046579 A1* | 2/2021 | Rodriguez ............. B22F 12/50 |
| 2021/0146471 A1* | 5/2021 | Rodriguez ........... B23K 20/128 |
| 2021/0252632 A1* | 8/2021 | Eller ........................ B21C 25/02 |
| 2022/0176633 A1* | 6/2022 | Hardwick ............... B33Y 30/00 |
| 2023/0057714 A1* | 2/2023 | Huang ................... B22F 12/50 |
| 2023/0146110 A1* | 5/2023 | Allison .............. B23K 20/1255 228/112.1 |

FOREIGN PATENT DOCUMENTS

| | | | | |
|---|---|---|---|---|
| CN | 106077946 A | * | 11/2016 | .......... B23K 20/125 |
| CN | 106112253 A | * | 11/2016 | |
| CN | 106735223 A | * | 5/2017 | |
| CN | 107088702 A | * | 8/2017 | ......... B23K 20/1255 |
| CN | 107160030 A | * | 9/2017 | |
| CN | 108115263 A | * | 6/2018 | ......... B23K 20/1245 |
| CN | 108672936 A | * | 10/2018 | ............. B23K 26/34 |
| CN | 109261962 A | * | 1/2019 | ............. B08B 9/093 |
| CN | 109317815 A | * | 2/2019 | |
| CN | 109514075 A | * | 3/2019 | ............. B23K 26/00 |
| CN | 210475821 U | * | 5/2020 | |
| CN | 111250711 A | * | 6/2020 | |
| CN | 111804910 A | * | 10/2020 | ............ B22F 1/0085 |
| CN | 111922507 A | * | 11/2020 | |
| CN | 112122768 A | * | 12/2020 | ........... B23K 20/122 |
| CN | 112828441 A | * | 5/2021 | ........ B23K 20/1215 |
| CN | 109906127 B | * | 6/2021 | ............. B22F 10/20 |
| CN | 110834373 B | * | 7/2021 | ............. B28B 1/001 |
| CN | 113118612 A | * | 7/2021 | ........... B23K 20/122 |
| CN | 113146021 A | * | 7/2021 | ........ B23K 20/1215 |
| CN | 113351984 A | * | 9/2021 | |
| CN | 113695597 A | * | 11/2021 | |
| CN | 113857643 A | * | 12/2021 | |
| CN | 115091025 A | * | 9/2022 | |
| CN | 115122042 A | * | 9/2022 | |
| CN | 115178855 A | * | 10/2022 | |
| DE | 202019003737 U1 | * | 11/2019 | |
| EP | 1430986 A1 | * | 6/2004 | ........... B23K 20/122 |
| JP | H0610796 A | * | 1/1994 | |
| JP | 2855812 B2 | * | 2/1999 | |
| JP | 2020142293 A | * | 9/2020 | ......... B23K 20/1255 |
| KR | 102265585 B1 | * | 6/2021 | |
| WO | WO-0185385 A1 | * | 11/2001 | ........... B23K 20/122 |
| WO | WO-2008023500 A1 | * | 2/2008 | ........ B23K 20/1235 |
| WO | WO-2009062216 A1 | * | 5/2009 | ........... B23K 20/125 |
| WO | WO-2010074165 A1 | * | 7/2010 | ........ B23K 20/1255 |
| WO | WO-2015025851 A1 | * | 2/2015 | ........ B23K 20/1255 |
| WO | WO-2016019049 A1 | * | 2/2016 | ........... B29C 48/2566 |
| WO | WO-2019089764 A1 | * | 5/2019 | ............. B22F 10/00 |
| WO | WO-2020155540 A1 | * | 8/2020 | ............. B22F 3/105 |
| WO | WO-2021163742 A1 | * | 8/2021 | ........... B23K 20/122 |
| WO | WO-2022122446 A1 | * | 6/2022 | ........... B23K 20/122 |

* cited by examiner

ADDITIVE FRICTION STIR DEPOSITION SYSTEM FOR REFRACTORY METALS

BACKGROUND

Friction stir processing is a solid-state process in which a rotating tool modifies the microstructure of a workpiece to process the workpiece without melting the feedstock. Friction stir processing may be used in additive deposition systems, such as for 3D printing, coating, or the like.

SUMMARY

Disclosed herein is an additive friction stir deposition system for refractory metals. The additive friction stir deposition system includes a tool assembly and an induction element. The tool assembly includes a metal shaft defining a shaft central channel, and a ceramic tip defining a tip central channel. The metal shaft and the ceramic tip are configured to interlock to prevent relative rotation therebetween. The induction element is positioned adjacent to the ceramic tip. As a refractory metal feedstock is fed through the shaft central channel and the tip central channel, the induction element heats the portion of the refractory metal feedstock within the tip central channel, but does not heat the ceramic tip itself. Accordingly, the refractory metal feedstock can be heated prior to application to a workpiece without heating the tip of the tool assembly, improving performance of the additive friction stir deposition system and the resulting workpiece.

In one aspect, a tool assembly comprises a metal shaft comprising a shaft mating interface at a lower end of the metal shaft. The metal shaft defines a shaft central channel extending along a shaft axis. The tool assembly further comprises a ceramic tip comprising a tip mating interface at an upper end of the ceramic tip. The ceramic tip defines a tip central channel extending along a tip axis. The tip central channel is configured to align with the shaft central channel to receive refractory metal feedstock therethrough. The tip mating interface interlocks with the shaft mating interface to prevent rotation of the ceramic tip relative to the metal shaft.

In another aspect, an additive friction stir deposition system comprises a friction stir tool assembly comprising a metal shaft comprising a shaft mating interface at a lower end of the metal shaft. The metal shaft defines a shaft central channel extending along a shaft axis. The tool further comprises a ceramic tip comprising a tip mating interface at an upper end of the ceramic tip. The ceramic tip defines a tip central channel extending along a tip axis. The tip mating interface interlocks with the shaft mating interface to prevent rotation of the ceramic tip relative to the metal shaft. The additive friction stir deposition system further comprises a spindle system configured to rotate the tool assembly. The additive friction stir deposition system further comprises a feed system configured to supply refractory metal feedstock through the shaft central channel and the tip central channel. The additive friction stir deposition system further comprises a workpiece control system comprising a platform configured to translate a workpiece relative to the rotation tool.

In another aspect, a method of additive friction stir deposition comprises feeding refractory metal feedstock through a shaft central channel of a metal shaft of a tool assembly and a ceramic central channel of a ceramic tip of the tool assembly. The method further comprises rotating the tool assembly such that the metal shaft and the ceramic tip rotate, and the ceramic tip is locked rotationally relative to the metal shaft.

Those skilled in the art will appreciate the scope of the disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1A:
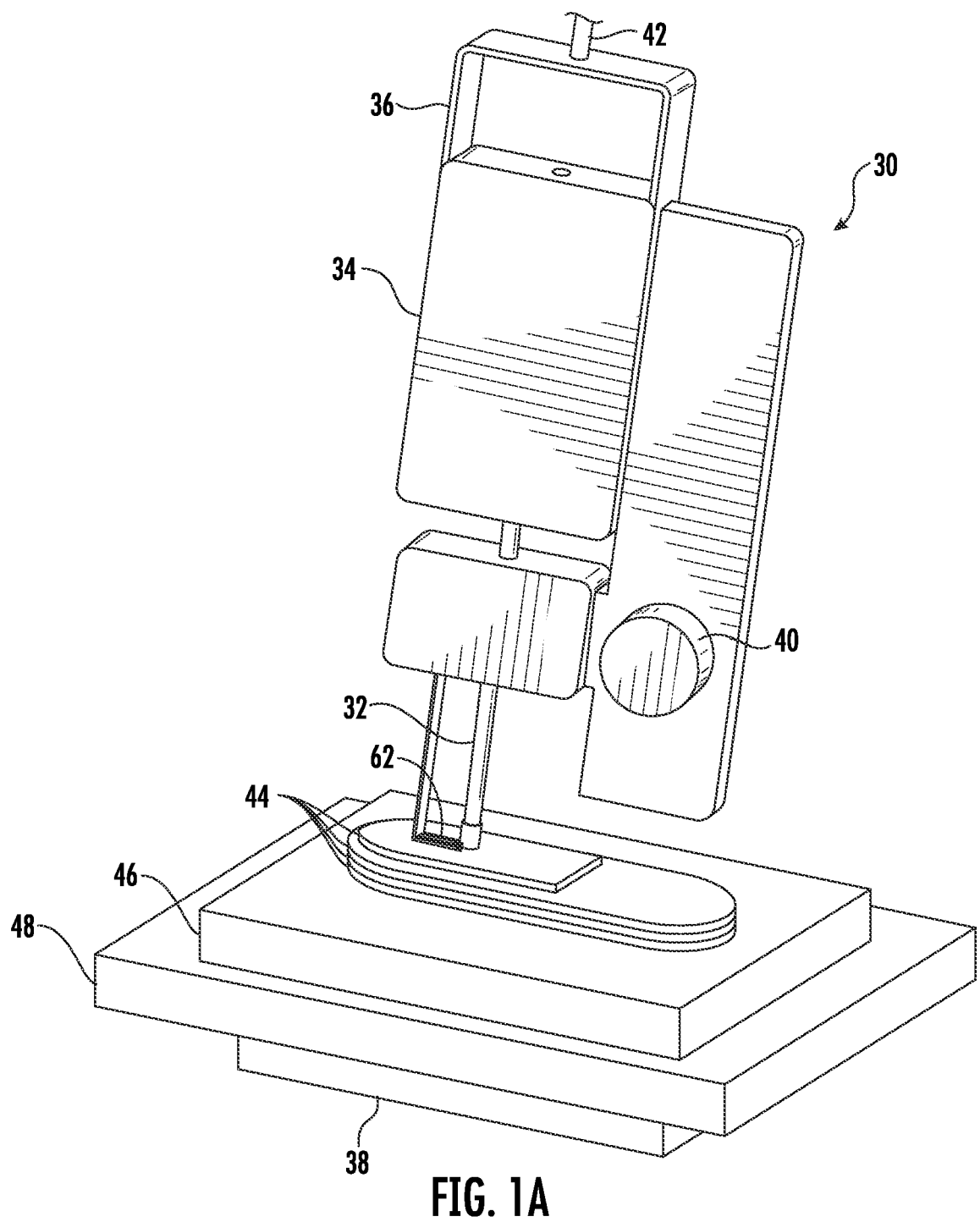
FIG. 1A is a perspective view of an additive friction stir deposition system according to the present disclosure.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A or B, or both A and B.

Disclosed herein is an additive friction stir deposition system for refractory metals. The additive friction stir deposition system includes a tool assembly and an induction element. The tool assembly includes a metal shaft defining a shaft central channel, and a ceramic tip defining a tip central channel. The metal shaft and the ceramic tip are configured to interlock to prevent relative rotation therebetween. The induction element is positioned adjacent to the ceramic tip. As a refractory metal feedstock is fed through the shaft central channel and the tip central channel, the induction element heats the portion of the refractory metal feedstock within the tip central channel, but does not heat the ceramic tip itself. Accordingly, the refractory metal feedstock can be heated prior to application to a workpiece without heating the tip of the tool assembly, improving performance of the additive friction stir deposition system and the resulting workpiece.

Friction stir processing is a solid-state process in which a rotating pin tool modifies the microstructure of a workpiece to process the workpiece without melting feedstock. Friction stir processing may be used in additive deposition systems, such as for 3D printing, coating, or the like. Processing high-temperature metals, such as refractory metals, can be challenging as the softening or melting temperature of the feedstock may be close to that of the corresponding friction stir deposition tool. Due to high rotation, the feedstock is heated and thereafter friction stirred with the workpiece. A heat zone is formed as a result of such rotation, which includes the feedstock and the surface of the tool itself. This may negatively affect application of the deposition layer and the final workpiece created.

Some additive friction stir deposition systems attempt to increase the temperature difference between the tool and the feedstock to facilitate application of the friction stir deposition layer, however, such efforts are often counterproductive. For example, certain systems may attempt to heat the feedstock to soften the feedstock prior to application to the workpiece, but doing so often heats the corresponding tool. Other systems may attempt to cool the tool with a cooling jacket, but doing so often cools the corresponding feedstock.

Figure 1B:
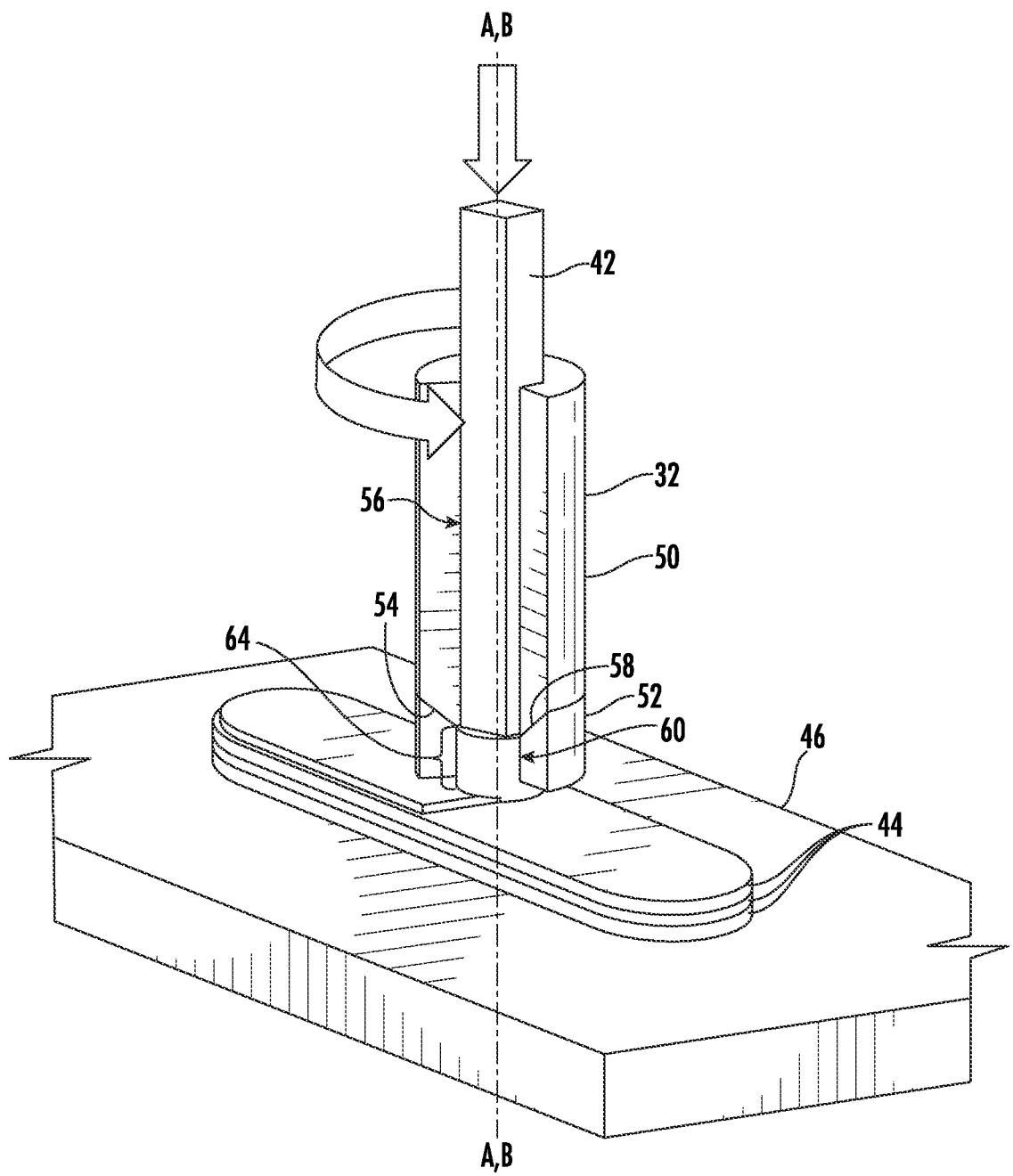
FIG. 1B is a perspective view of a portion of the additive friction stir deposition system.
Figure 2A:
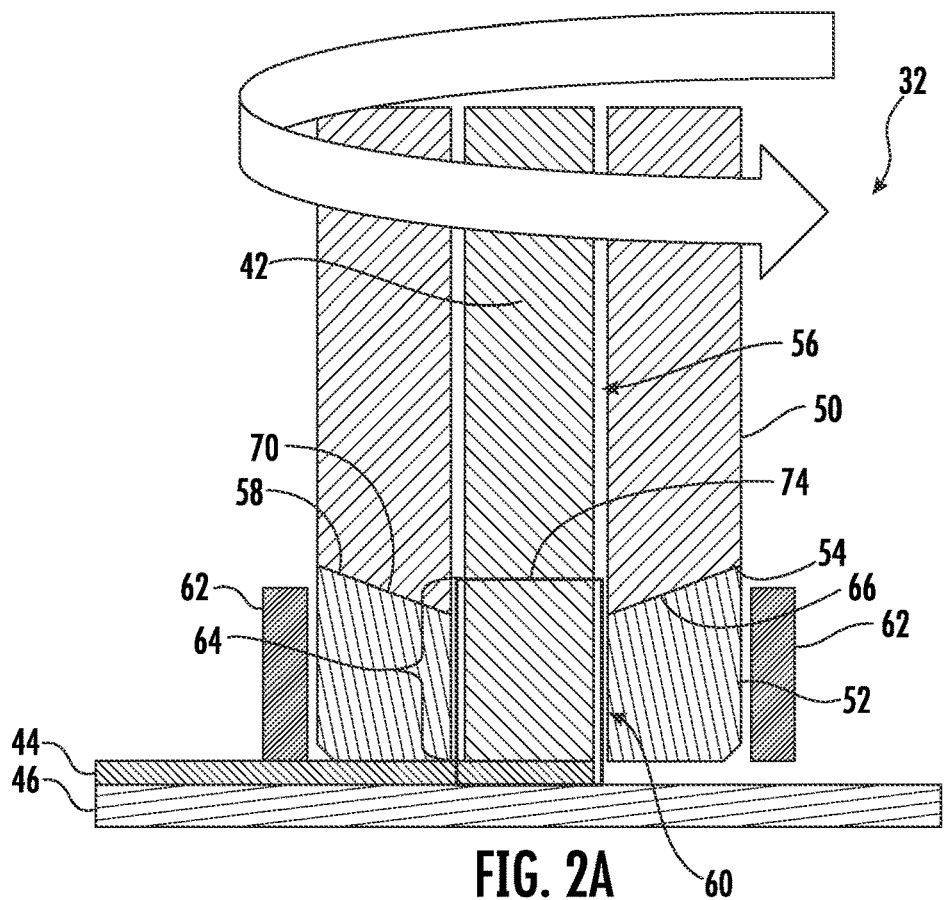
FIG. 2A is a cross-sectional side view of a tool assembly of the additive friction stir deposition system of FIG. 1A, the tool assembly including a ceramic tip.
Figure 2B:
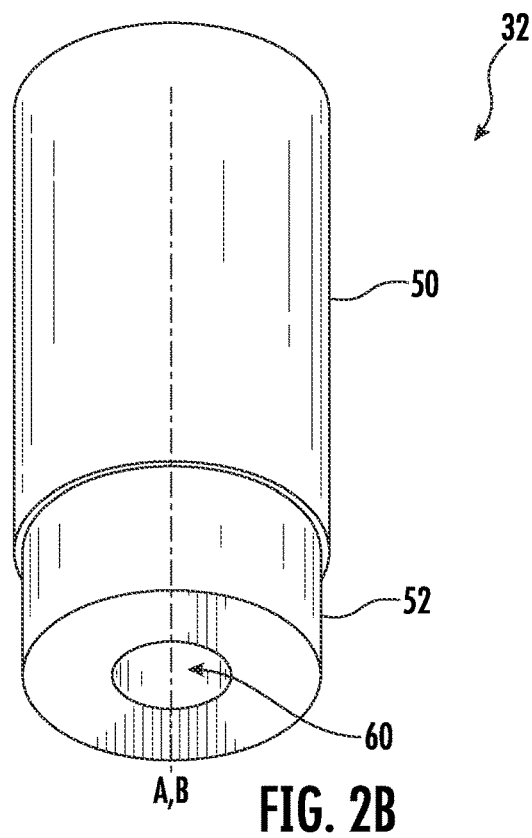
FIG. 2B is an assembled perspective view of the tool assembly of FIG. 2A with the ceramic tip mated to a metal shaft.
Figures 2C, 2D:
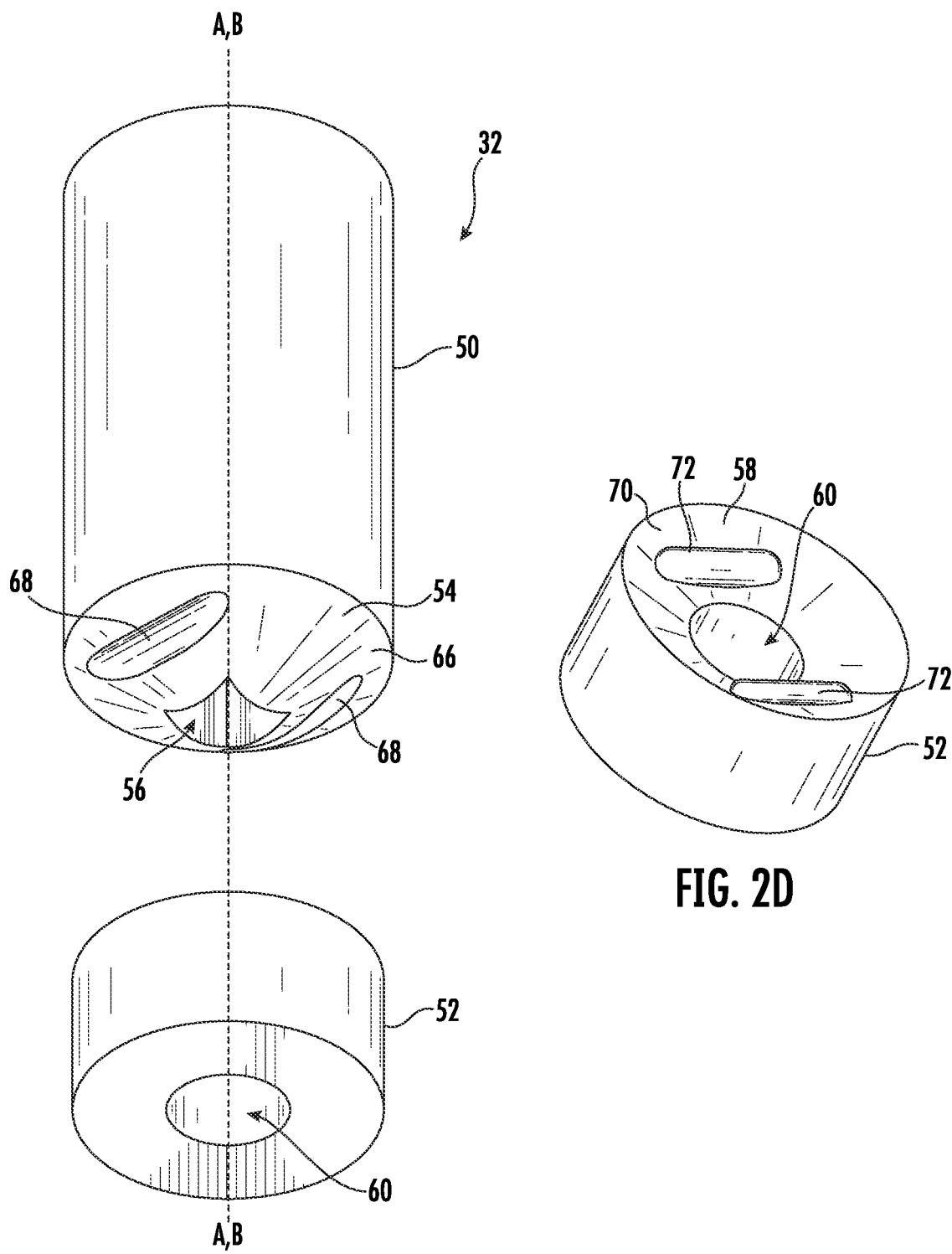
FIG. 2C is an exploded perspective view of the tool assembly of FIG. 2A with the ceramic tip separated from the metal shaft.
FIG. 2D is a perspective view of a mating interface of the ceramic tip of the tool assembly of FIG. 2A.

FIGS. 1A-1B are views of an additive friction stir deposition system 30 according to the present disclosure. The additive friction stir deposition system 30 may also be referred to as a friction stir system, friction deposition system, solid-state additive manufacturing, or the like.

Friction stir processing (FSP) is a solid-state process in which a non-consumable rotating pin tool or die assembly traverses along the surface of a workpiece or billet to modify the microstructure of the billet. As can be appreciated, FSP is an adaptation of friction stir welding (FSW) in which a non-consumable rotating pin tool is forcibly inserted and pushed laterally through the workpiece with the objective of joining workpieces together without melting. In particular, heat generated by friction between a rotating tool and a workpiece leads to a softened region proximate the tool, which mechanically stirs and intermixes the elements together, thereby joining the two elements to each other. For additive friction stir deposition, rotating feedstock contacts and generates friction heat against the workpiece to join the two together. The additive friction stir deposition system 30 may be used for 3D printing, coating, cladding, joining, repairing, or the like.

The additive friction stir deposition system 30 includes a tool assembly 32, a spindle system 34, a feed system 36, a workpiece control system 38, and a heating system 40. It is noted that various computer devices and/or sensors may be used to automate portions of operation of the additive friction stir deposition system 30. The additive friction stir deposition system 30 applies feedstock 42 as one or more deposition layers 44 to a workpiece 46 supported by a substrate 48, which may also be referred to as a platform. In certain embodiments, the feedstock 42 is a refractory metal feedstock. Refractory metals are a group of metallic elements that are highly resistant to heat and wear. In certain embodiments, refractory metals have a melting point above 2,200° C., a group which includes, for example, niobium, molybdenum, tantalum, tungsten, and/or rhenium. In certain embodiments, refractory metals have a melting point above 1,850° C., a group which includes, for example, titanium, vanadium, chromium, zirconium, hafnium, ruthenium, rhodium, osmium, and/or iridium. However, the additive friction stir deposition system 30 may be used for other metals and materials as well.

The tool assembly 32 is configured for additive friction stir deposition. In particular, the tool assembly 32 is used to hold the rotating feedstock 42 in place, while withstanding the rotational and traversing forces to create a deposition layer 44. The tool assembly 32 must not become incorporated into the deposition layer 44.

The tool assembly 32 includes a metal shaft 50 and a ceramic tip 52 captured in a central position to direct the deposition. The metal shaft 50 includes a shaft mating interface 54 at a lower end of the metal shaft 50. The metal shaft 50 defines a shaft central channel 56 extending along a shaft axis A. The metal shaft 50 is configured to receive and rotate the feedstock 42.

The ceramic tip 52 may include a ceramic material, such as ceramic fiber. The ceramic tip 52 includes a tip mating interface 58 at an upper end of the ceramic tip 52. The ceramic tip 52 defines a tip central channel 60 extending along a tip axis B. The tip mating interface 58 interlocks with the shaft mating interface 54 to prevent rotation of the ceramic tip 52 relative to the metal shaft 50. In certain embodiments, the ceramic tip 52 is not ceramic, but is instead another non-conductive material. The downward force of the metal shaft 50 on the ceramic tip 52 places compression forces into the ceramic tip 52 that resist and counter-balance tension forces created by the feedstock 42. These compression forces aid in keeping the ceramic tip 52 intact.

The spindle system 34 is configured to rotate the tool assembly 32, such as by a motor. The feed system 36 is configured to supply feedstock 42, such as refractory metal feedstock, through the shaft central channel 56 of the metal shaft 50, and the tip central channel 60 of the ceramic tip 52. Accordingly, as the tool assembly 32 rotates, the feedstock 42 rotates and is fed through the tool assembly 32.

The workpiece control system 38 includes a platform 48 configured to translate the workpiece 46 relative to the tool assembly 32. Accordingly, the tool assembly 32 remains stationary while the workpiece 46 translates relative to the tool assembly 32. However, in other embodiments, the tool assembly 32 may be configured to translate relative to the workpiece 46 as well.

The heating system 40 includes one or more induction elements 62 adjacent to the ceramic tip 52. The induction element 62 is configured to heat a heating portion 64 of the feedstock 42 within the tip central channel 60 of the ceramic tip 52. The induction element 62 is applied at the deposition point. The metal feedstock 42 is heated within the tip central channel 60 of the ceramic tip 52, but the ceramic tip 52 is not heated by the induction element 62 because ceramic is a dielectric. By heating the heating portion 64 of the feedstock 42 within the tip central channel 60 of the ceramic tip 52, the frictional force required to start a deposit is reduced, the physical demands on the tool assembly 32 are reduced, and/or the tooling cost is reduced. The deposition rate, tool life, and thermal performance are increased, while the tool cost and tooling time are decreased. For example, the feedstock 42 deposition is improved while the tool assembly 32 and/or the workpiece 46 experience lower thermal stresses.

FIGS. 2A-2D are views of a tool assembly 32 of the additive friction stir deposition system of FIG. 1A. As noted above, the tool assembly 32 includes a metal shaft 50 and a ceramic tip 52.

The metal shaft 50 includes a shaft mating interface 54 at a lower end of the metal shaft 50. The metal shaft 50 defines a shaft central channel 56 extending along a shaft axis A. The shaft central channel 56 has a rectangular cross-section. In particular, the shaft central channel 56 has a square cross-section. The metal shaft 50 is configured to receive and rotate the feedstock 42. Although a rectangular cross-section is illustrated, the shaft central channel 56 may use any non-circular cross-section. Use of the non-circular cross-section ensures that rotation of the metal shaft 50 rotates the feedstock 42 which has a corresponding non-circular cross-section.

The shaft mating interface 54 includes a conical surface 66 with a locking element embodied as two notches 68 positioned on opposing sides of the shaft central channel 56. The shaft mating interface 54 includes a conical surface 66 with the notches 68 offset from and perpendicular to the shaft central channel 56. As explained in more detail below, the shaft mating interface 54 interlocks with the tip mating interface 58 of the ceramic tip 52 to prevent relative rotation therebetween.

The ceramic tip 52 defines a tip central channel 60 extending along a tip axis B. The tip central channel 60 has a generally circular cross-section and is larger than the shaft central channel 56. The ceramic tip 52 is configured to hold the feedstock 42 in place at the deposition point, but the ceramic tip 52 is not intended to rotate the feedstock 42. The circular cross-section decreases stress and potential cracking or fracture of the ceramic tip 52. Accordingly, the metal shaft 50 is more durable and can withstand greater stress than the ceramic tip 52. The metal shaft 50 is used to rotate the feedstock 42 and comprises at least a majority of a length of the tool assembly 32. This distributes the stress from the torque along the length of the metal shaft 50. For example, in certain embodiments, the metal shaft 50 comprises at least 50%, 70%, 80%, 90%, or 85% of a length of the tool assembly 32.

The ceramic tip 52 includes a tip mating interface 58 at an upper end of the ceramic tip 52. The tip mating interface 58 includes a conical surface 70 with a locking element embodied as two nubs 72 offset from and perpendicular to the tip central channel 60, and positioned on opposing sides of the tip central channel 60. The tip mating interface 58 interlocks with the shaft mating interface 54 to prevent rotation of the ceramic tip 52 relative to the metal shaft 50. In particular, the conical surface 66 of the metal shaft 50 corresponds to and mates with the conical surface 70 of the ceramic tip 52. The conical surfaces 66, 70 self-center the ceramic tip 52 relative to the metal shaft 50.

Positioning the notches 68 on opposing sides of the shaft central channel 56 and/or the nubs 72 on opposing sides of the tip central channel 60 rotationally distributes the relative stress between the metal shaft 50 and the ceramic tip 52. However, the locking elements may be any of a variety of numbers, shapes, or configurations.

The notches 68 of the metal shaft 50 receive the nubs 72 of the ceramic tip 52 to rotationally lock the ceramic tip 52 relative to the metal shaft 50. Although the metal shaft 50 includes a convex conical surface 66 with notches 68, and the ceramic tip 52 includes a concave conical surface 70 with nubs 72, it is noted that such features may be interchangeable between the metal shaft 50 and the ceramic tip 52. For example, the metal shaft 50 may include a convex conical surface and/or nubs and the ceramic tip 52 may include a concave conical surface and/or notches.

It is noted that the ceramic tip 52 may be rotationally locked relative to the metal shaft 50, but is generally free to translate along the shaft axis A. However, in operation, the pressure of the ceramic tip 52 against the workpiece 46 prevents the ceramic tip 52 from disengaging the metal shaft 50.

With the mating conical surfaces 66, 70, the tip central channel 60 is configured to align with the shaft central channel 56 to receive refractory metal feedstock 42 therethrough.

Generally, the ceramic tip 52 is less durable than the metal shaft 50. Accordingly, the length of the ceramic tip 52 is minimized as much as possible, and is generally limited to about a height of the induction element 62. In certain embodiments, a height of the ceramic tip 52 is more than a height of a portion of the induction element 62 proximate the ceramic tip 52.

The induction element 62 heats the heating portion 64 of the feedstock 42 within the tip central channel 60. Doing so concentrates the heat zone 74 to a center of the tool assembly 32, and particularly to the feedstock 42 proximate the workpiece 46.

Figure 3A:
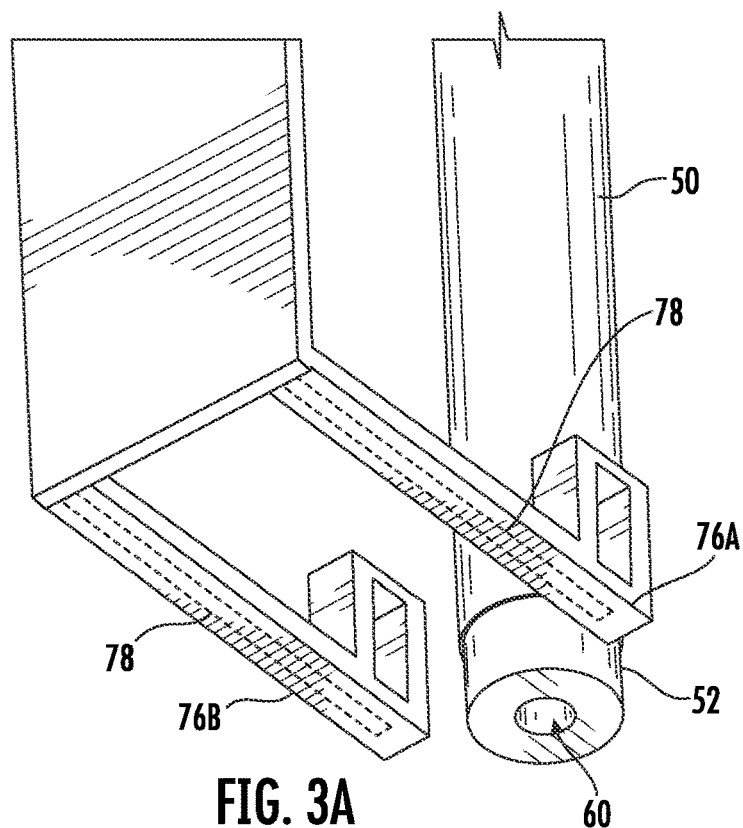
FIG. 3A is a perspective view of a portion of the additive friction stir deposition system of FIG. 1A illustrating an induction element positioned adjacent to the ceramic tip of the tool assembly.
Figure 3B:
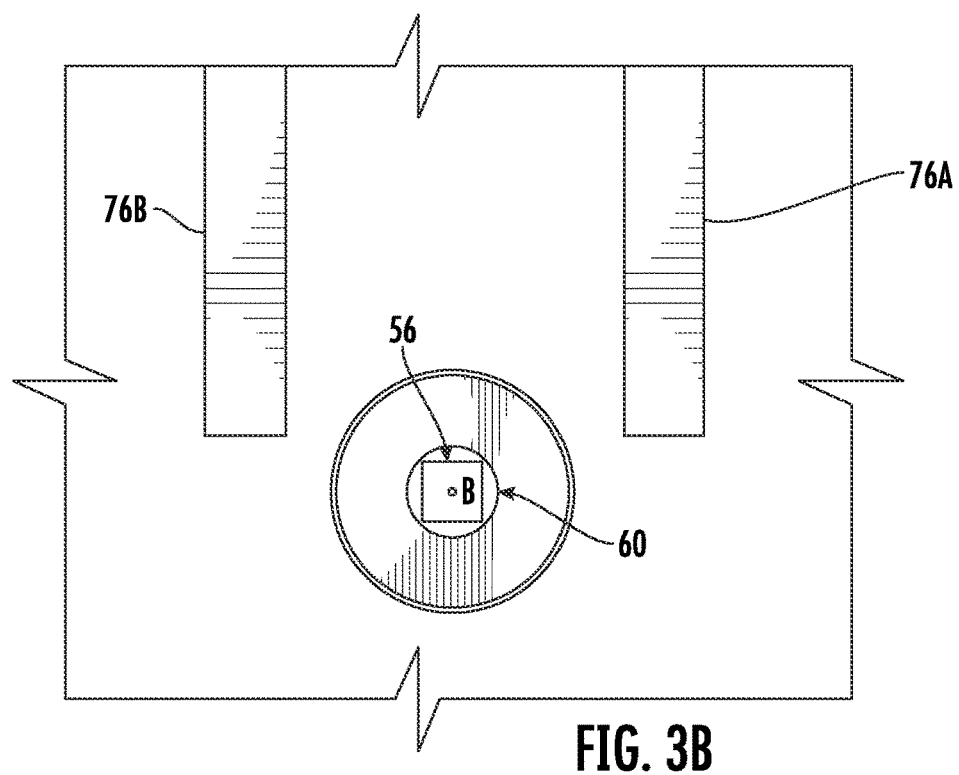
FIG. 3B is a bottom view of the portion of the additive friction stir deposition system of FIG. 3A.

FIGS. 3A-3B are views of the additive friction stir deposition system of FIG. 1A illustrating an induction element 62 positioned adjacent to the ceramic tip 52 of the tool assembly. The induction element 62 is configured to heat a heating portion 64 of the refractory metal feedstock 42 within the tip central channel 60 of the ceramic tip 52.

In certain embodiments, the induction element 62 includes a first induction arm 76A and a second induction arm 76B on opposing sides of the ceramic tip 52. It is noted that because the feedstock 42 and the ceramic tip 52 rotate rapidly and the induction permeates in a wave, the induction arms 76A, 76B do not need to be positioned on opposite sides of a tip axis B. Instead, the induction arms 76A, 76B may be positioned offset from the tip axis B and need only be positioned proximate the feedstock 42 and the ceramic tip 52.

In certain embodiments, the induction arms 76A, 76B of the induction element 62 include cooling cores 78 configured to flow coolant through the induction element 62.

Figure 4:
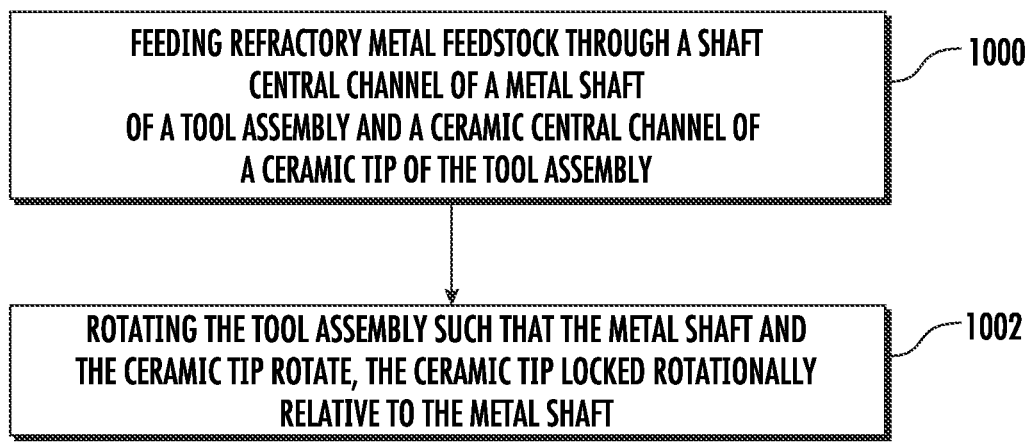
FIG. 4 is a flowchart illustrating a method of additive friction stir deposition according to the present disclosure.

FIG. 4 is a flowchart illustrating a method of friction stir deposition according to the present disclosure. FIG. 4 will be discussed in conjunction with FIGS. 1A-3B. The method includes feeding refractory metal feedstock 42 through a shaft central channel 56 of a metal shaft 50 of a tool assembly 32 and a tip central channel 60 of a ceramic tip 52 of the tool assembly 32 (1000). The method further includes rotating the tool assembly 32 such that the metal shaft 50 and the ceramic tip 52 rotate, the ceramic tip 52 locked rotationally relative to the metal shaft 50 (1002).

In certain embodiments, the method further includes translating a workpiece 20 relative to the tool assembly 32. In certain embodiments, the method further includes heating, by an induction element 62 adjacent to the ceramic tip 52, a heating portion 64 of the refractory metal feedstock 42 within the tip central channel 60 of the ceramic tip 52. In certain embodiments, the method further includes pumping coolant through the induction element 62.

Figure 5:
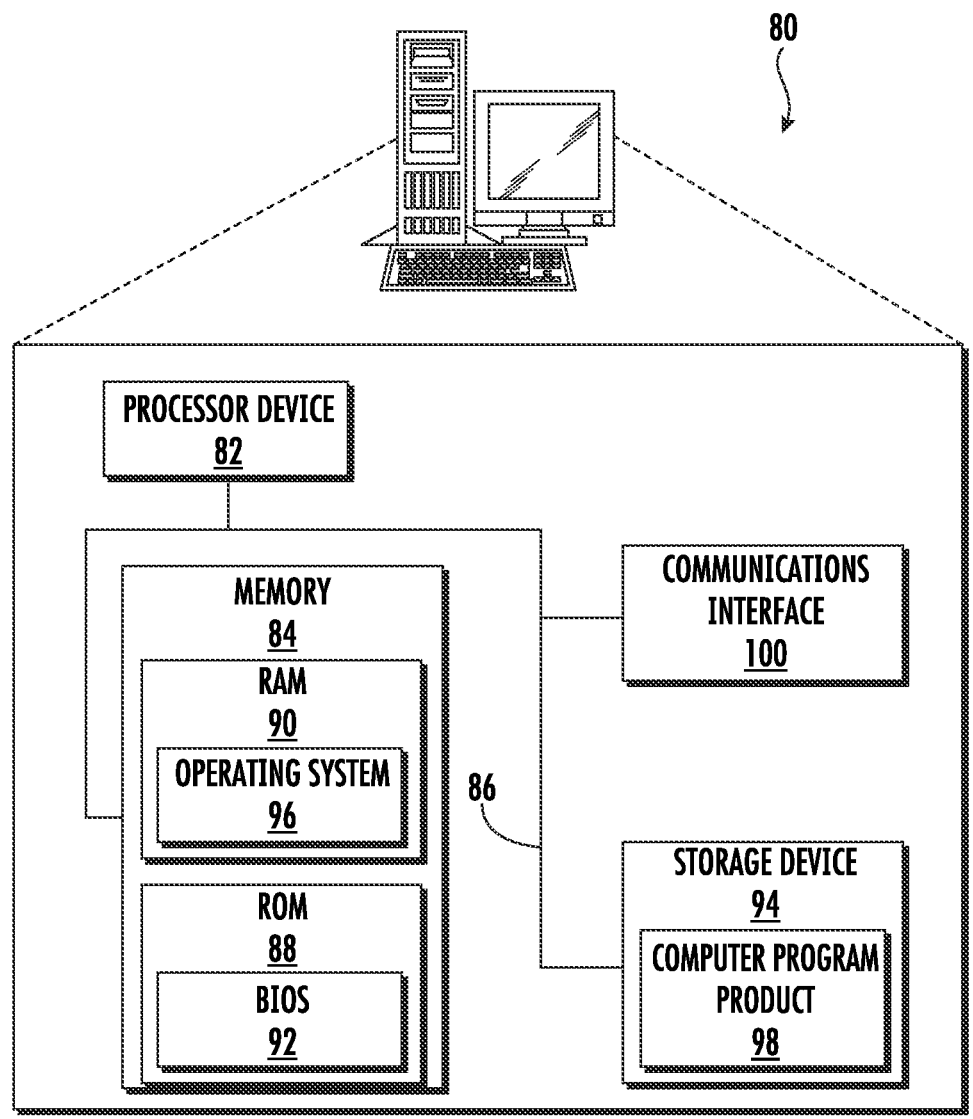
FIG. 5 is a block diagram of a computing device containing components suitable for implementing any of the processing devices disclosed herein.

FIG. 5 is a block diagram of a computing device 80 containing components suitable for implementing any of the processing devices disclosed herein. The computing device 80 includes a processor device 82, a system memory 84, and a system bus 86. The system bus 86 provides an interface for system components including, but not limited to, the system memory 84 and the processor device 82. The processor device 82 can be any commercially available or proprietary processor.

The system bus 86 may be any of several types of bus structures that may further interconnect to a memory bus (with or without a memory controller), a peripheral bus, and/or a local bus using any of a variety of commercially available bus architectures. The system memory 84 may include non-volatile memory 88 (e.g., read-only memory (ROM), erasable programmable read-only memory (EPROM), electrically erasable programmable read-only memory (EEPROM), and the like), and volatile memory 90 (e.g., random-access memory (RAM)). A basic input/output system (BIOS) 92 may be stored in the non-volatile memory 88 and can include the basic routines that help transfer information between elements within the computing device 80. The volatile memory 90 may also include a high-speed RAM, such as static RAM, for caching data.

The computing device 80 may further include or be coupled to a non-transitory computer-readable storage medium such as storage device 94, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 94 and other drives associated with computer-readable media and computer-usable media may provide non-volatile storage of data, data structures, computer-executable instructions, and the like.

A number of modules can be stored in the storage device 94 and in the volatile memory 90, including an operating system 96 and one or more program modules, which may implement the functionality described herein in whole or in part. All or a portion of the examples herein may be implemented as a computer program product 98 stored on a transitory or non-transitory computer-usable or computer-readable storage medium, such as the storage device 94, which includes complex programming instructions, such as complex computer-readable program code, to cause the processor device 82 to carry out the steps described herein. Thus, the computer-readable program code can comprise software instructions for implementing the functionality of the examples described herein when executed on the processor device 82. The processor device 82, in conjunction with the network manager in the volatile memory 90, may serve as a controller or control system for the computing device 80 that is to implement the functionality described herein.

The computing device 80 may also include one or more communication interfaces 100, depending on the particular functionality of the computing device 80. The communication interfaces 100 may comprise one or more wired Ethernet transceivers, wireless transceivers, fiber, satellite, and/or coaxial interfaces by way of non-limiting examples.

Other computer system designs and configurations may also be suitable to implement the systems and methods described herein. The following examples illustrate various implementations in accordance with one or more aspects of the disclosure.

Those skilled in the art will recognize improvements and modifications to the preferred embodiments of the disclosure. All such improvements and modifications are considered within the scope of the concepts disclosed herein and the claims that follow.

What is claimed is:

1. A tool assembly, comprising:
   a metal shaft comprising a shaft mating interface at a lower end of the metal shaft, the metal shaft defining a shaft central channel extending along a shaft axis; and
   a ceramic tip comprising a tip mating interface at an upper end of the ceramic tip, the ceramic tip defining a tip central channel extending along a tip axis, the tip mating interface comprises a conical surface with at least one locking element offset from and perpendicular to the shaft central channel;
   wherein the tip central channel is configured to align with the shaft central channel to receive refractory metal feedstock therethrough; and
   wherein the tip mating interface interlocks with the shaft mating interface to prevent rotation of the ceramic tip relative to the metal shaft.

2. The tool assembly of claim 1, wherein the tool assembly is configured for additive friction stir deposition.

3. The tool assembly of claim 1, wherein the shaft central channel comprises a rectangular cross-section and the tip central channel comprises a circular cross-section.

4. The tool assembly of claim 1, further comprising an induction element adjacent to the ceramic tip, the induction element configured to heat a heating portion of the refractory metal feedstock within the tip central channel of the ceramic tip.

5. The tool assembly of claim 4, wherein the induction element comprises a first induction arm and a second induction arm on opposing sides of the ceramic tip.

6. The tool assembly of claim 4, wherein the induction element comprises a cooling core configured to flow coolant.

7. The tool assembly of claim 1, wherein the at least one locking element comprises at least one of a notch or protrusion.

8. An additive friction stir deposition system, comprising:
   a tool assembly comprising:
      a metal shaft comprising a shaft mating interface at a lower end of the metal shaft, the metal shaft defining a shaft central channel extending along a shaft axis; and
      a ceramic tip comprising a tip mating interface at an upper end of the ceramic tip, the ceramic tip defining a tip central channel extending along a tip axis;
      wherein the tip mating interface interlocks with the shaft mating interface to prevent rotation of the ceramic tip relative to the metal shaft; a spindle system configured to rotate the tool assembly;
   a feed system configured to supply refractory metal feedstock through the shaft central channel and the tip central channel; and
   a workpiece control system comprising a platform configured to translate a workpiece relative to the rotation tool.

9. The additive friction stir deposition system of claim 8, wherein the shaft central channel comprises a rectangular cross-section and the tip central channel comprises a circular cross-section.

10. The additive friction stir deposition system of claim 8, further comprising a heating system comprising an induction element adjacent to the ceramic tip, the induction element configured to heat a heating portion of the refractory metal feedstock within the tip central channel of the ceramic tip.

11. The additive friction stir deposition system of claim 10, wherein the induction element comprises a first induction arm and a second induction arm on opposing sides of the ceramic tip.

12. The additive friction stir deposition system of claim 10, wherein the induction element comprises a cooling core configured to flow coolant.

13. The additive friction stir deposition system of claim 8, wherein the tip mating interface comprises a conical surface with at least one locking element offset from and perpendicular to the shaft central channel.

14. The additive friction stir deposition system of claim 13, wherein the at least one locking element comprises at least one of a notch or protrusion.

15. A method of additive friction stir deposition, comprising:
  feeding refractory metal feedstock through a shaft central channel of a metal shaft of a tool assembly and a ceramic central channel of a ceramic tip of the tool assembly; and
  rotating the tool assembly such that the metal shaft and the ceramic tip rotate, the ceramic tip locked rotationally relative to the metal shaft.

16. The method of claim 15, further comprising translating a workpiece relative to the tool.

17. The method of claim 15, further comprising heating, by an induction element adjacent to the ceramic tip, a heating portion of the refractory metal feedstock within the tip central channel of the ceramic tip.

18. The method of claim 15, further comprising pumping coolant through the induction element.

19. The method of claim 15, wherein the shaft central channel comprises a rectangular cross-section and the tip central channel comprises a circular cross-section.

* * * * *